United States Patent Office 3,124,591
Patented Mar. 10, 1964

3,124,591
4-SUBSTITUTED 1,2-DIARYL-3,5-DIOXO-PYRAZOLIDINES
Rolf Denss and Franz Häfliger, Basel, Switzerland, assignors to Geigy Chemical Corporation, Ardsley, N.Y., a corporation of Delaware
No Drawing. Filed Aug. 3, 1960, Ser. No. 47,138
Claims priority, application Switzerland, Aug. 4, 1959
11 Claims. (Cl. 260—310)

The present invention concerns new 4-substituted 1,2-diaryl-3,5-dioxo-pyrazolidines which have valuable pharmacological properties.

It has surprisingly been found that 4-substituted 1,2-diaryl-3,5-dioxo-pyrazolidines of the general formula

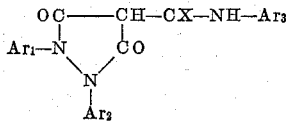

(I)

wherein $Ar_1$ represents the phenyl radical, a hydroxyphenyl, methylphenyl, lower alkoxyphenyl, benzyloxyphenyl or acetoxyphenyl radical,
$Ar_2$ represents the phenyl radical or a methylphenyl radical,
$Ar_3$ represents the phenyl radical, a methylphenyl, lower alkoxyphenyl, dimethoxyphenyl, acetylphenyl, acetoxyphenyl, benzyloxyphenyl or hydroxyphenyl radical, and
X represents oxygen or sulphur, are obtained if 1,2-diaryl-3,5-dioxo-pyrazolidines of the general formula

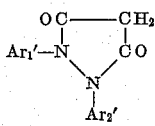

(II)

are reacted, in the presence of pyridine in the warm, with aryl isocyanates or isothiocyanates of the general formula $$Ar_3'—N=C=X \qquad (III)$$

wherein $Ar_1'$, $Ar_2'$ and $Ar_3'$ represent radicals as defined for $Ar_1$, $Ar_2$ and $Ar_3$ with the exception of hydroxyphenyl radicals. If desired, compounds in which at least one of the radicals $Ar_1'$, $Ar_2'$ and $Ar_3'$ is a benzyloxyphenyl or acetoxyphenyl radical and, in the former case, wherein X is advantageously oxygen, are then converted by hydrogenolysis or hydrolysis respectively into compounds in which at least one of the radicals $Ar_1$, $Ar_2$ or $Ar_3$ is a hydroxyphenyl radical.

The new compounds produced according to the above process have valuable pharmacological properties, in particular anti-inflammatory, antipyretic, analgetic and uricosuric activity. They can be used for the treatment of rheumatic diseases and gout and may be administered both parenterally and per os.

A number of starting materials of the general Formula II are already known; such compounds are generally produced, for example, by condensing suitable N,N'-diaryl hydrazines with malonic acid diethyl ester in the presence of one mol of a sodium alcoholate in a low alkanol or a benzene hydrocarbon. The condensation is performed at the boiling temperature of the solvent.

Examples of compounds of the general Formula II are: 1,2-diphenyl-3,5-dioxo-pyrazolidine, 1-(o-methylphenyl)-, 1-(p-methylphenyl-, 1-(p-methoxyphenyl)-, 1-(p-ethoxyphenyl)-, 1-(p-acetoxyphenyl)-, 1-(m-benzyloxyphenyl)- and 1-(p-benzyloxyphenyl)-2-phenyl-3,5-dioxo-pyrazolidine, 1,2 - bis - (p - methylphenyl)-3,5-dioxo-pyrazolidine, 1 -(m - methylphenyl) - 2 - (p' - methoxyphenyl) - 3,5-dioxo - pyrazolidine, 1 - (m - methylphenyl)-2-(p'-ethoxyphenyl) - 3,5 - dioxo-pyrazolidine, 1-(m-methylphenyl)-2-(p'-benzyloxyphenyl)-3,5-dioxo-pyrazolidine, 1-(m-methylphenyl)-2-(p'-acetoxyphenyl)- and 1-(p-methylphenyl)-2-(p'-methoxyphenyl)-3,5-dioxo-pyrazolidine.

Suitable starting materials of the general Formula III are, for example, phenyl isocyanate, o-methylphenyl isocyanate, m-methylphenyl isocyanate, p-methylphenyl isocyanate, o-methoxy-, p-methoxy-, p-ethoxy, 2,5-dimethoxy-, m-acetyl-, o-acetoxy-, p-acetoxy-, o-benzyloxy-, m-benzyloxy- and p-benzyloxy-phenyl isocyanate as well as phenyl isothiocyanate and the corresponding substituted aryl isothiocyanates (aryl mustard oils).

The reactions of 1,2 - diaryl - 3,5 - dioxo - pyrazolidines with aryl isocyanates or aryl isothiocyanates to form 1,2-diaryl-4-aryl carbamyl-3,5-dioxo-pyrazolidines of the general Formula I are performed advantageously in the warm in the presence of pyridine and, if necessary, in the further presence of an inert organic solvent, e.g. a benzene hydrocarbon such as benzene, toluene or xylene.

The hydrogenolytic liberation of one or more hydroxyl groups from benzyloxy groups can be performed, for example, in the presence of Raney nickel, palladium or platinum catalysts, even at room temperature and normal pressure. The hydrolysis of compounds containing one or more acetoxyphenyl radicals is performed, for example, by means of alcoholic sodium hydroxide or potassium hydroxide.

The compounds of the general Formula I produced according to the invention form salts with inorganic and organic bases, some of which are water soluble.

The following examples further illustrate the production of the new compounds according to the invention without, however, limiting it in any way thereto. Parts are given therein as parts by weight and their relationship to parts by volume is as that of grammes to cubic centimetres. The temperatures are in degrees centigrade.

Example 1

11.9 parts of phenyl isocyanate are dissolved in 20 parts by volume of benzene and the solution is added dropwise while stirring to a mixture of 25.2 parts of 1,2-diphenyl-3,5-dioxo-pyrazolidine and 35 parts by volume of pyridine and 200 parts by volume of benzene. The reaction mixture is then refluxed for 4 hours after which it is stirred for about 14 hours at room temperature. The precipitated reaction product is filtered off under suction, extracted several times with 2 N-hydrochloric acid and thoroughly washed with water. After recrystallising from benzene 1,2-diphenyl-4-phenyl carbamyl-3,5-dioxo-pyrazolidine melts at 170–172°. On using 28 parts of 1,2-dis-(p-methylphenyl)-3,5-dioxo-pyrazolidine, 1,2-bis-(p-methylphenyl)-4-phenyl carbamyl-3,5-dioxo-pyrazolidine is obtained in an analogous manner.

Example 2

133 parts of phenyl isocyanate dissolved in 150 parts by volume of benzene are added within 15 minutes while stirring to a suspension of 400 parts of 1-(p-benzyloxyphenyl)-2-phenyl-3,5-dioxo-pyrazolidine in 179 parts by volume of pyridine and 1100 parts by volume of benzene. The reaction mixture is refluxed for 6 hours and, after cooling, the reaction product is filtered off under suction. It is treated with hydrochloric acid and water analogously to Example 1 and then extracted twice more at 40–50° with 2000 parts by volume of alcohol each time. The 1-(p-benzyloxyphenyl)-2-phenyl-4-phenyl carbamyl-3,5-dioxo-pyrazolidine so obtained melts at 123–125°.

330 parts of the above p-benzyloxy compound are dissolved in 700 parts by volume of 2 N-caustic soda lye and 1400 parts by volume of alcohol and the solution is shaken in a hydrogen atmosphere at room temperature and normal pressure with 150 parts of Raney nickel catalyst. After the calculated amount of hydrogen has been taken up, the catalyst is filtered off and the filtrate is acidified with 720 parts by volume of 2 N-hydrochloric acid. The crystals which precipitate are filtered off under suction, washed with water and dissolved in 3000 parts by volume of 1 N-caustic soda lye. On adding excess 2 N-hydrochloric acid to the filtered solution, pure 1-(p-hydroxyphenyl)-2-phenyl-4-phenyl carbamyl-3,5-dioxo-pyrazolidine precipitates. It is filtered off under suction and thoroughly washed with water. M.P. 225–227°.

On using p-methoxyphenyl isocyanate, 1-(p-hydroxyphenyl)-2-phenyl-4-(p'-methoxyphenyl carbamyl) - 3,5-dioxo-pyrazolidine is obtained in an analogous manner. M.P. 186–187° (from isopropanol).

*Example 3*

A mixture of 25 parts of 1,2-diphenyl-3,5-dioxo-pyrazolidine, 15 parts of p-methoxyphenyl isocyanate and 15 parts by volume of anhydrous pyridine in 250 parts by volume of benzene is stirred and refluxed for 15 hours. After cooling, the precipitated crude product is filtered off, stirred for half an hour with 500 parts of 1 N-caustic soda lye and filtered off under suction. The filter cake is stirred with 2 N-hydrochloric acid, again filtered, and the residue is washed with water, dried and recrystallised twice from anhydrous ethanol. The 1,2-diphenyl-4-(p-methoxyphenyl carbamyl)-3,5-dioxo-pyrazolidine so obtained melts at 147–150°.

*Example 4*

A mixture of 25 parts of 1,2-diphenyl-3,5-dioxo-pyrazolidine, 15 parts of o-methoxyphenyl isocyanate and 50 parts by volume of anhydrous pyridine is stirred for 7 hours at 100°, then cooled and poured into 500 parts of water. The crude product is filtered off under suction, washed with water, then stirred with a mixture of 2 N-hydrochloric acid and methanol, again filtered and the residue is thoroughly washed with water. It is then recrystallised first from 2000 parts by volume of a mixture of ethanol and butanone 2:1 and then from butanone, whereupon 1,2-diphenyl-4-(o-methoxyphenyl carbamyl)-3,5-dioxo-pyrazolidine is obtained. M.P. 196–199°.

1,2-diphenyl-4-(p-methoxyphenyl carbamyl)-3,5-dioxo-pyrazolidine is obtained in an analogous manner on using the same amount of p-methoxyphenyl isocyanate and reacting for 3 hours. On repeated recrystallisation from ethanol it melts at 150–152°. In the first crystallisation here and with the following compounds, 10 parts by volume of concentrated hydrochloric acid are added to completely decompose the pyridine salt present in the crude product.

Also, 1,2-diphenyl-4-(p-ethoxyphenyl carbamyl)-3,5-dioxo-pyrazolidine (M.P. 140–143° from ethanol) is obtained analogously on using 16.3 parts of p-ethoxyphenyl isocyanate and reacting for 1 hour; 1,2-diphenyl-4-(2',5'-dimethoxyphenyl carbamyl)-3,5-dioxo-pyrazolidine (M.P. 171–175° from ethanol/ethyl acetate) is obtained analogously on using 18 parts of 2,5-dimethoxyphenyl isocyanate and reacting for 1 hour.

*Example 5*

A mixture of 50 parts of 1,2-diphenyl-3,5-dioxo-pyrazolidine, 27 parts of phenyl isothiocyanate and 100 parts by volume of anhydrous pyridine are stirred for 12 hours at 100°. After cooling, it is poured into a mixture of 1000 parts of water and 200 parts by volume of ethanol and the undissolved substance is filtered off under suction. To remove the oily parts, the filter cake is washed with ether and then repeatedly with water and it is finally crystallised from a mixture of 500 parts by volume of ethanol, 400 parts by volume of acetone and 10 parts by volume of concentrated hydrochloric acid. The 1,2-diphenyl-4-phenyl thiocarbamyl-3,5-dioxo-pyrazolidine so obtained is recrystallised from cyclohexane and then melts at 137–139°.

*Example 6*

A mixture of 25.2 parts of 1,2-diphenyl-3,5-dioxo-pyrazolidine, 17.7 parts of p-acetoxyphenyl isocyanate and 100 parts by volume of pyridine are heated while stirring on a steam bath for 2 hours. After cooling, the reaction mixture is stirred into 1000 parts of water and the whole is made acid to Congo red paper by the addition of ice and concentrated hydrochloric acid. The reaction product is then filtered off under suction and washed neutral with water.

The crude and still moist 1,2-diphenyl-4-(p-acetoxyphenyl carbamyl)-3,5-dioxo-pyrazolidine so obtained is refluxed for 15 minutes with 100 parts by volume of 2 N-sodium hydroxide in 400 parts by volume of ethanol. 1000 parts of water are then added and the whole is filtered over active charcoal. The filtrate is heated to about 50°, 300 parts by volume of ethanol are added and it is made acid to Congo red paper with concentrated hydrochloric acid. After cooling and leaving to stand for several hours, the 1,2-diphenyl-4-(p-hydroxyphenyl carbamyl)-3,5-dioxo-pyrazolidine which precipitates is filtered off under suction, washed neutral and dried. After recrystallising twice, first from 600 and then from 500 parts by volume of ethanol, the pure substance melts at 190–193°.

The same compound is also obtained by reacting, analogously to the first reaction step, 25.2 parts of 1,2-diphenyl-3,5-dioxo-pyrazolidine with 21 parts of p-benzyloxyphenyl isocyanate and then hydrogenolysing the 1,2-diphenyl - 4 - (p - benzyloxyphenyl carbamyl)-3,5-dioxo-pyrazolidine obtained analogously to Example 2 or Example 11.

*Example 7*

25.2 parts of 1,2-diphenyl-3,5-dioxo-pyrazolidine, 17.7 parts of o-acetoxyphenyl isocyanate and 50 parts by volume of anhydrous pyridine are heated on a steam bath while stirring for 2 hours. The reaction mixture which becomes solid on cooling is stirred into 500 parts of water, the crude product is filtered off under suction and repeatedly washed with water. It is then stirred into ice cooled 1 N-hydrochloric acid, again filtered under suction, washed neutral with water and dried in vacuo. It is recrystallised from 1500 parts by volume of methanol which contains 10 parts by volume of concentrated hydrochloric acid. The 1,2-diphenyl-4-(o-acetoxyphenyl carbamyl)-3,5-dioxo-pyrazolidine so obtained melts at 148° on decomposition.

10.7 parts of the above product with 25 parts by volume of 2 N-sodium hydroxide and 100 parts by volume of ethanol are refluxed for 15 minutes. The reaction solution is then poured into 500 parts of water, the milky cloudiness is removed with active charcoal and the filtrate is acidified with 30 parts by volume of 2 N-hydrochloric acid. The 1,2-diphenyl-4-(o-hydroxyphenyl carbamyl)-3,5-dioxo-pyrazolidine precipitates immediately but to facilitate the filtration, the whole is first heated for 2 hours on a steam bath. The reaction product is then filtered off and recrystallised from 150 parts by volume of dioxan. M.P. 220–221° on decomposition.

Instead of obtaining the acetoxy compound in crystalline form, also the reaction mixture which has been stirred in water can be extracted with 1000 parts by volume of chloroform, the extract washed with water, dried with sodium sulphate and concentrated in a rotary evaporator. The oily residue can be hydrolysed as described above to form the hydroxy compound.

*Example 8*

25.2 parts of 1,2-diphenyl-3,5-dioxo-pyrazolidine, 19.3 parts of p-acetoxyphenyl mustard oil and 50 parts by volume of pyridine are heated on a steam bath while stirring for 3 hours. After cooling, the reaction mixture is dissolved in a mixture of ethyl acetate and benzene, the solution is washed twice with water, twice with 2 N-hydrochloric acid and twice with saturated sodium chloride solution whereupon it is dried with sodium sulphate and concentrated. The greasy residue is boiled with 500 parts by volume of ethanol and, after cooling, the pulverulent, undissolved substance is filtered off and recrystallised from butanone while decolouring with charcoal. The 1,2-diphenyl-4-(p-acetoxyphenyl thiocarbamyl)-3,5-dioxopyrazolidine so obtained melts at 174–176°.

11.1 parts of the above product are boiled under reflux with 40 parts by volume of 2 N-sodium hydroxide, and 40 parts by volume of ethanol, for 5 minutes. The reaction solution is then diluted with water whereby it remains clear. On acidifying with 2 N-hydrochloric acid the 1,2-diphenyl-4-(p-hydroxyphenyl thiocarbamyl)-3,5-dioxo-pyrazolidine precipitates; it is filtered off under suction, washed with water and dried. After recrystallisation from ethanol, it melts at 206–209°.

In an analogous manner, on using 28 parts of 1,2-bis-(p-methylphenyl)-3,5-dioxo-pyrazolidine, 1,2-bis-(p-methylphenyl)-4-(p' - acetoxyphenyl thiocarbamyl)-3,5-dioxo-pyrazolidine is obtained and, from this, 1,2-bis-(p-methylphenyl)-4-(p'-hydroxyphenyl thiocarbamyl) - 3,5 - dioxo-pyrazolidine is obtained.

*Example 9*

16 parts of m-acetylphenyl isocyanate are added to a mixture of 25 parts of 1,2-diphenyl-3,5-dioxo-pyrazolidine and 50 parts by volume of anhydrous pyridine whereupon a strong exothermic reaction takes place, the temperature rising to about 100°. The reaction mixture which solidifies into a crystal mass is left to stand for 10 minutes, then stirred into 500 parts of water, the undissolved substance is filtered off, thoroughly washed with water and finally recrystallised from a mixture of 500 parts by volume of ethanol and 25 parts by volume of concentrated hydrochloric acid. The 1,2-diphenyl-4-(m-acetylphenyl carbamyl)-3,5-dioxo-pyrazolidine is recrystallised from ethanol and, if desired, then from ethyl acetate whereupon it melts at 144° on decomposition.

On using amounts of more than about 1/10 mol, the strong exothermic reaction should be allowed for by a relative increase in the amount of pyridine and/or gradual addition of the m-acetylphenyl isocyanate.

*Example 10*

36 parts of 1-(p-benzyloxyphenyl)-2-phenyl-3,5-dioxo-pyrazolidine are dissolved in 100 parts by volume of anhydrous pyridine and 16 parts of m-acetylphenyl isocyanate are added whereupon heat is generated. The reaction mixture is left to stand for about 14 hours without heating and is then poured into 1000 parts of water. The crude product which separates in an oily form is separated and stirred with hydrochloric acid and water 1:1 until a solid product is obtained. This is combined with the further solid substance obtained by acidifying the aqueous phase, and the whole is dissolved in the mixture of 500 parts by volume of warm glacial acetic acid and 25 parts by volume of concentrated hydrochloric acid. After filtering, the solution is slowly added dropwise while stirring to 1000 parts of ice cold water, the precipitated substance is filtered off and washed neutral. After drying in vacuo, the 1-(p-benzyloxyphenyl)phenyl-4-(m'-acetylphenyl carbamyl)-3,5-dioxo-pyrazolidine melts at 91–95°.

26 parts of the above reaction product in 150 parts by volume of dioxan are hydrogenised at room temperature and normal pressure in the presence of 2 parts of palladium charcoal catalyst until the equimolar amount of hydrogen has been taken up. The catalyst is then filtered off, the solvent is evaporated off and the residue is dissolved in a mixture of 50 parts by volume of 2 N-caustic soda lye and 50 parts by volume of ethanol while warming. The solution is diluted with water to 600 parts and the precipitated substance is filtered off using Hyflo. The filtrate is acidified with hydrochloric acid, the precipitate is filtered off, washed with water and dried over calcium chloride. The 1-(p-hydroxyphenyl)-2-phenyl-4-(m'-acetylphenyl carbamyl)-3,5-dioxo-pyrazolidine so obtained is dissolved in 30 parts by volume of warm ethanol, the solution is filtered and the filtrate is kept for several days under ice cooling. The substance which crystallises out melts at 170–173° and, after further recrystallisation from ethanol, at 174–175°.

*Example 11*

36 parts of 1-(p-benzyloxyphenyl)-2-phenyl-3,5-dioxo-pyrazolidine and 15 parts of p-methoxyphenyl isocyanate in 50 parts by volume of anhydrous pyridine are heated for 4 hours on a steam bath. After cooling, the reaction mixture is dissolved in 500 parts by volume of ethyl acetate and the solution is washed first with saturated sodium chloride solution and then twice each with 2 N-sodium hydroxide, 2 N-hydrochloric acid and saturated sodium chloride solution. It is dried over sodium sulphate, concentrated to about half the volume and, while still hot, hot cyclohexane is added. After cooling, the 1 - (p - benzyloxyphenyl) - 2 - phenyl - 4 - (p' - methoxyphenyl carbamyl)-3,5-dioxo-pyrazolidine is filtered off and recrystallised from ethyl acetate. M.P. 147–150°.

22 parts of the above product are hydrogenated at room temperature and normal pressure in 500 parts of dioxan and in the presence of 5 parts of palladium charcoal until the equimolar amount of hydrogen has been taken up. The catalyst is then filtered off, the filtrate is evaporated, the residue is dissolved in 1000 parts of 0.2 N-sodium hydroxide solution, the solution is clarified with active charcoal and Hyflo and then acidified with dilute hydrochloric acid. The product which separates out is filtered off, washed with water, dried and repeatedly recrystallised from anhydrous ethanol. The 1-(p-hydroxyphenyl)-2-phenyl-4-(p'-methoxyphenyl carbamyl) - 3,5 - dioxo-pyrazolidine so obtained melts at 188–190°.

In an analogous manner, on using 16.3 parts of p-ethoxyphenyl isocyanate, 1 - (p - benzyloxyphenyl) - 2 - phenyl - 4 - (p' - ethoxyphenyl carbamyl) - 3,5 - dioxo-pyrazolidine is obtained (M.P. 119–122° from anhydrous ethanol) and from this, 1-(p-hydroxyphenyl)-2-phenyl-4-(p'-ethoxyphenyl carbamyl)-3,5-dioxo-pyrazolidine is obtained (M.P. 189–191° from ethanol); on using 15 parts of o-methoxyphenyl isocyanate, 1-(p-benzyloxyphenyl)-2-phenyl-4-(o'-methoxyphenyl carbamyl)-3,5-dioxo-pyrazolidine (M.P. 180–182° from butanone) is obtained and, from this, 1-(p-hydroxyphenyl)-2-phenyl-4-(o'-methoxyphenyl carbamyl)-3,5-dioxo-pyrazolidine (M.P. 205–206° on decomposition from dioxan/butanone) is obtained; on using 13.3 parts of p-methylphenyl isocyanate, 1-(p-benzyloxyphenyl) - 2 - phenyl - 4 - (p' - methylphenyl carbamyl)-3,5-dioxo-pyrazolidine is obtained and, from this, 1 - (p - hydroxyphenyl) - 2 - phenyl - 4 - (p' - methylphenyl carbamyl)-3,5-dioxo-pyrazolidine is obtained; and on using 13.3 parts of o-methylphenyl isocyanate, 1-(p-benzyloxyphenyl) - 2 - phenyl - 4 - (o' - methylphenyl carbamyl)-3,5-dioxo-pyrazolidine is obtained and, from this, 1 - (p - hydroxyphenyl) - 2 - phenyl - 4 - (o' - methylphenyl carbamyl)-3,5-dioxo-pyrazolidine is obtained.

Also, on reacting analogously to the first reaction step 28.2 parts of 1-(p-methoxyphenyl)-2-phenyl-3,5-dioxo-pyrazolidine or 28 parts of 1,2-bis-(p-methylphenyl)-3,5-dioxo-pyrazolidine with 15 parts of p-methoxyphenyl isocyanate, 1 - (p - methoxyphenyl) - 2 - phenyl - 4 - (p'-methoxyphenyl carbamyl)-3,5-dioxo-pyrazolidine or 1,2-bis - (p - methylphenyl)-4-(p'-methoxyphenyl carbamyl)-3,5-dioxo-pyrazolidine respectively are obtained.

*Example 12*

36 parts of 1-(p-benzyloxyphenyl)-2-phenyl-3,5-dioxo-pyrazolidine, 18 parts of 2,5-dimethoxyphenyl isocyanate and 50 parts by volume of anhydrous pyridine are heated for 1 hour on a steam bath and, while still hot, poured into a mixture of 100 parts by volume of concentrated hydrochloric acid and about 400 parts of ice. The crude product is filtered off, thoroughly washed with water, then stirred for about 30 minutes with 50 parts by volume of concentrated ammonia solution in 1000 parts of water, again filtered off and washed first with water and then with 1 N-hydrochloric acid. It is then dissolved in the warm in 1000 parts of glacial acetic acid to which 10 parts by volume of concentrated hydrochloric acid have been added and, after cooling, the solution is added dropwise to 1000 parts of cold water. The precipitated 1-(p-benzyloxyphenyl) - 2 - phenyl - 4 - (2',5'-dimethoxyphenyl carbamyl)-3,5-dioxo-pyrazolidine is filtered off, washed with water and dried in vacuo. M.P. 82–85°.

27 parts of 1-(p-benzyloxyphenyl)-2-phenyl-4-(2',5'-dimethoxyphenyl carbamyl)-3,5-dioxo-pyrazolidine in 170 parts by volume of dioxan are hydrogenated at room temperature and normal pressure in the presence of 6 parts of palladium charcoal catalyst until no more hydrogen is taken up. The hydrogenation product, the greater part of which has precipitated, is filtered off with the catalyst and the filter residue is extracted with dilute caustic soda lye. The filtrate is evaporated and the residue is also extracted with dilute caustic soda lye; the combined alkaline extracts are filtered through Hyflo and acidified with hydrochloric acid. The precipitated crude 1-(p-hydroxyphenyl) - 2 - phenyl - 4 - (2',5' - dimethoxyphenyl carbamyl)-3,5-dioxo-pyrazolidine is filtered off under suction, washed neutral with water, dried over calcium chloride and recrystallised from about 220 parts by volume of ethanol while decolouring with charcoal. On repeated crystallisation from ethanol, the pure substance melts at 195–198°.

*Example 13*

36 parts of 1-(p-benzyloxyphenyl)-2-phenyl-3,5-dioxo-pyrazolidine, 17.7 parts of o-acetoxyphenyl isocyanate and 50 parts by volume of pyridine are heated at 100° on a steam bath for 2 hours. After cooling, the reaction mixture is dissolved in ethyl acetate, then washed twice with each of water, 2 N-hydrochloric acid and saturated sodium chloride solution, dried with sodium sulphate and evaporated.

The crude 1-(p-benzyloxyphenyl)-2-phenyl-4-(o'-acetoxyphenyl carbamyl)-3,5-dioxo-pyrazolidine which remains as a viscous oil is refluxed for 1 hour with 100 parts by volume of 2 N-caustic soda lye and 100 parts of alcohol whereupon, from the solution which was clear at the beginning, the sodium salt of the hydrolysis product gradually precipitates as a yellow powder. The reaction mixture is left to stand for several hours under ice cooling, the precipitated sodium salt is filtered off and washed with ethanol and water. It is then boiled in 250 parts by volume of dioxan with 10 parts by volume of concentrated hydrochloric acid, the dioxan solution, after filtration, is diluted to 1000 parts by volume with water and the oily substance which precipitates is filtered off under suction after it has solidified and is washed with water. On recrystallising from butanone, the 1-(p-benzyloxyphenyl)-2-phenyl-4-(o'-hydroxyphenylcarbamyl) - 3,5 - dioxo-pyrazolidine obtained melts at 209–210° on decomposition.

9.9 parts of the above hydrolysis product in the solution of 3.3 parts of sodium hydroxide in 500 parts of water are hydrogenated at room temperature and normal pressure in the presence of 22 parts of Raney nickel until the equimolar amount of hydrogen has been taken up. In this step, the starting material only dissolves during the hydrolysis. The catalyst is then filtered off, the green filtrate while still warm is acidified with hydrochloric acid, the precipitated hydrogenation product is filtered off after cooling, washed with water and recrystallised from about 700 parts by volume of ethanol with the addition of the same volume of water. The 1-(p-hydroxyphenyl)-2-phenyl-4-(o'-hydroxyphenyl carbamyl) - 3,5-dioxo-pyraz- olidine melts at 220° on decomposition and if desired, it is further purified, for example, by dissolving in caustic soda lye and precipitating with hydrochloric acid.

*Example 14*

3.72 parts of 1-(p-benzyloxyphenyl)-2-(m'-methylphenyl)-3,5-dioxo-pyrazolidine and 1.19 parts of phenyl isocyanate in 10 parts by volume of anhydrous pyridine are heated for 1 hour at 100°. After 5 minutes the reaction components have dissolved and the solution is green coloured. After cooling, the reaction mixture is poured into 100 parts of water, the pyridine salt of the condensation product is filtered off under suction, washed with water, suspended in 100 parts by volume of 4 N-hydrochloric acid, again filtered off under suction, washed neutral and dried in vacuo at 80°. It is then dissolved in 300 parts by volume of isopropanol with the addition of 2 parts by volume of concentrated hydrochloric acid and the 1-(p-benzyloxyphenyl) - 2 - (m' - methylphenyl) - 4 - phenylcarbamyl-3,5-dioxo-pyrazolidine is crystallised by allowing to stand for several days under ice cooling.

4.1 parts of the above crystal mass which still contains some pyridine salt, in 130 parts by volume of dioxan/dimethyl formamide mixture (1:1) are hydrogenated at room temperature and 4 atm. pressure in the presence of 2 parts of palladium charcoal catalyst until no more hydrogen is taken up. The catalyst is then filtered off, the filtrate is evaporated, the residue is dissolved in caustic soda lye, again precipitated with hydrochloric acid, filtered off, washed and dried. The 1-(p-hydroxyphenyl)-2-(m'-methylphenyl)-4-phenyl carbamyl-3,5-dioxo-pyrazolidine so obtained is recrystallised from dioxan and then melts at 198–200°. See also Example 15.

Analogously to the first process step, on using 29.6 parts of 1-(p-methoxyphenyl)-2-(m'-methylphenyl)-3,5-dioxo-pyrazolidine, 1 - (p-methoxyphenyl)-2-(m'-methylphenyl)-4-phenyl carbamyl-3,5-dioxo-pyrazolidine is obtained, and on using 31 parts of 1-(p-ethoxyphenyl)-2-(m'-methylphenyl)-3,5-dioxo-pyrazolidine, 1 - (p-ethoxyphenyl)-2-(m'-methylphenyl) - 4 - phenyl carbamyl - 3,5-dioxo-pyrazolidine is obtained.

*Example 15*

8.1 parts of 1-(p-acetoxyphenyl)-2-(m'-methylphenyl)-3,5-dioxo-pyrazolidine and 3 parts of phenyl isocyanate in 20 parts by volume of anhydrous pyridine are heated for 4 hours at 100°. After cooling, the reaction mixture is poured into a mixture of 50 parts by volume of concentrated hydrochloric acid and about 100 parts of ice, the crude product is filtered off under suction and washed with water.

The crude 1-(p-acetoxyphenyl)-2-(m'-methylphenyl)-4-phenyl carbamyl-3,5-dioxo-pyrazolidine so obtained which still contains some pyridine salt is boiled under reflux for 1 hour with 50 parts by volume of 2 N-caustic soda lye in 100 parts by volume of ethanol. The reaction solution is then diluted with water, if necessary filtered, and acidified with concentrated hydrochloric acid. To completely remove the pyridine, the precipitated substance is boiled with 10 parts by volume of concentrated hydrochloric acid in 100 parts by volume of ethanol and, after cooling, the precipitated substance is filtered off and washed with ethanol. The 1-(p-hydroxyphenyl)-2-(m'-methylphenyl)-4-phenyl carbamyl-3,5-dioxo-pyrazolidine so obtained melts at 199–201° on decomposition and after recrystallising from dioxan it melts at 200–202°. After mixing with the substance obtained according to Example 14, there is no depression of the melting point.

In an analogous manner, on using 3.4 parts of phenyl mustard oil, 1-(p-acetoxyphenyl)-2-(m'-methylphenyl)-4-phenyl thiocarbamyl-3,5-dioxo-pyrazolidine is obtained and, from this, 1-(p-hydroxyphenyl) - 2 - (m'-methylphenyl)-4-phenyl thiocarbamyl-3,5-dioxo-pyrazolidine is obtained.

Such compounds according to the general Formula I are of particular value wherein at least one of the symbols $Ar_1$ and $Ar_3$ is represented by a hydroxyphenyl radical. The most valuable group of compounds comprises those with the p-hydroxyphenyl radical as $Ar_1$, the phenyl radical as $Ar_2$ and the phenyl radical, the m-acetylphenyl radical, a lower alkoxyphenyl radical, the 2,5-dimethoxyphenyl radical or a hydroxyphenyl radical as $Ar_3$ and oxygen as X. Of equal value are compounds with a hydroxyphenyl radical as $Ar_3$ and phenyl radicals as $Ar_1$ and $Ar_2$.

What we claim is:

1. A 4-substituted 1,2-diaryl-3,5-dioxo-pyrazolidine of the formula

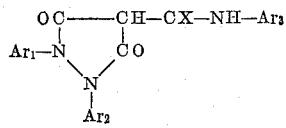

wherein
  $Ar_1$ is a member selected from the group consisting of phenyl, hydroxyphenyl, methylphenyl, lower alkoxyphenyl, benzyloxyphenyl and acetoxyphenyl,
  $Ar_2$ is a member selected from the group consisting of phenyl and methylphenyl,
  $Ar_3$ is a member selected from the group consisting of phenyl, methylphenyl, lower alkoxyphenyl, dimethoxyphenyl, acetylphenyl, acetoxyphenyl, benzyloxyphenyl and hydroxyphenyl, and
  X is a member selected from the group consisting of O and S.

2. 1 - (p-hydroxyphenyl) - 2 - phenyl - 4 - phenylcarbamyl-3,5-dioxo-pyrazolidine.

3. 1 - (p - hydroxyphenyl) - 2 - phenyl - 4 - (p' - methoxyphenylcarbamyl)-3,5-dioxo-pyrazolidine.

4. 1 - (p - hydroxyphenyl) - 2 - phenyl - 4 - (o'-methoxyphenylcarbamyl)-3,5-dioxo-pyrazolidine.

5. 1 - (p - hydroxyphenyl) - 2 - phenyl - 4 - (p' - ethoxyphenylcarbamyl)-3,5-dioxo-pyrazolidine.

6. 1 - (p - hydroxyphenyl) - 2 - phenyl - 4 - (2',5' - dimethoxyphenylcarbamyl)-3,5-dioxo-pyrazolidine.

7. 1 - (p - hydroxyphenyl) - 2 - phenyl - 4 - (m' - acetylphenylcarbamyl)-3,5-dioxo-pyrazolidine.

8. 1 - (p - hydroxyphenyl) - 2 - phenyl - 4 - (o' - hydroxyphenylcarbamyl)-3,5-dioxo-pyrazolidine, 9. 1,2 - diphenyl - 4 - (o' - hydroxyphenylcarbamyl) - 3,5-dioxo-pyrazolidine.

10. 1,2 - diphenyl - 4 - (p' - hydroxyphenylcarbamyl) - 3,5-dioxo-pyrazolidine.

11. 1,2 - diphenyl - 4 - (p' - hydroxyphenylthiocarbamyl)-3,5-dioxo-pyrazolidine.

References Cited in the file of this patent
UNITED STATES PATENTS 2,700,670   Hafliger _____ Jan. 25, 1955

FOREIGN PATENTS 781,551   Great Britain _____ Aug. 21, 1957